UNITED STATES PATENT OFFICE.

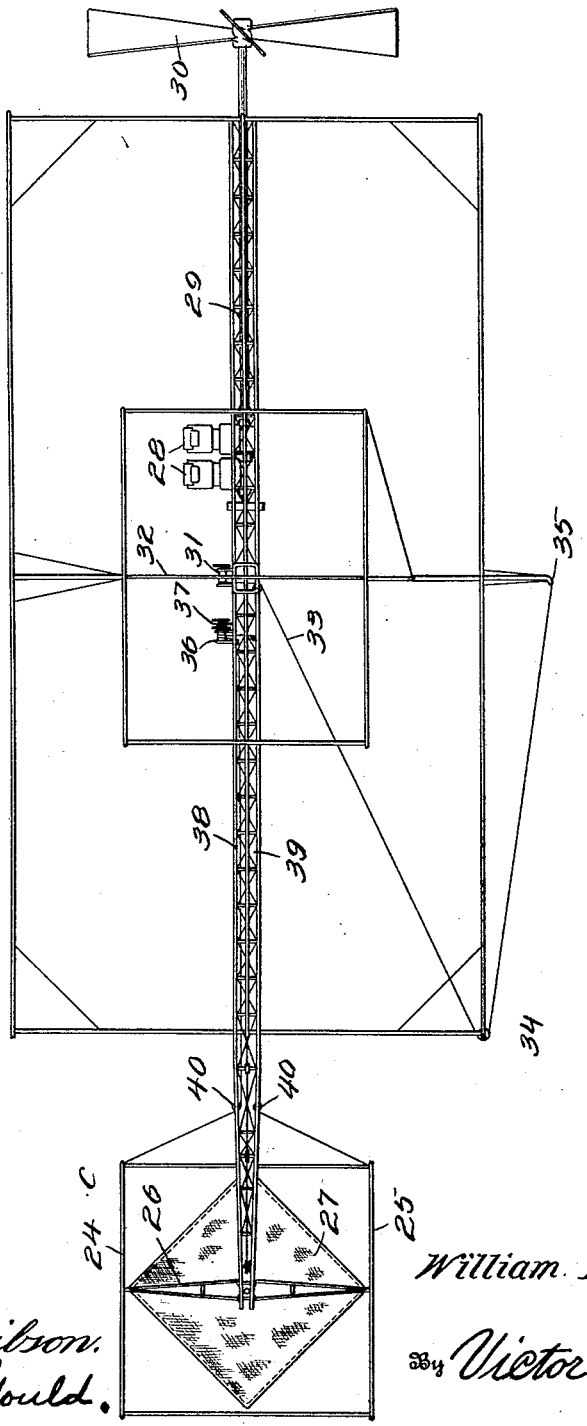

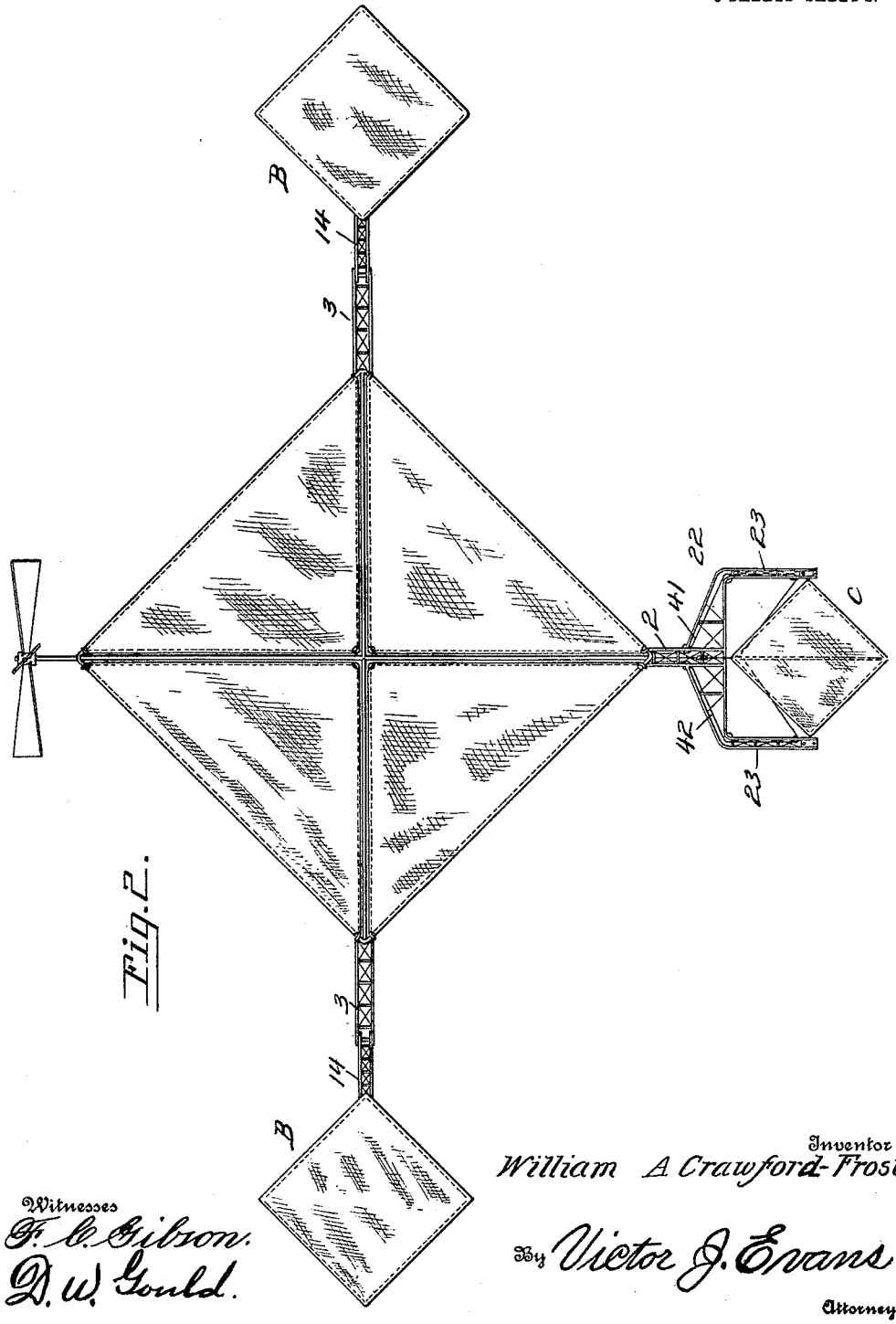

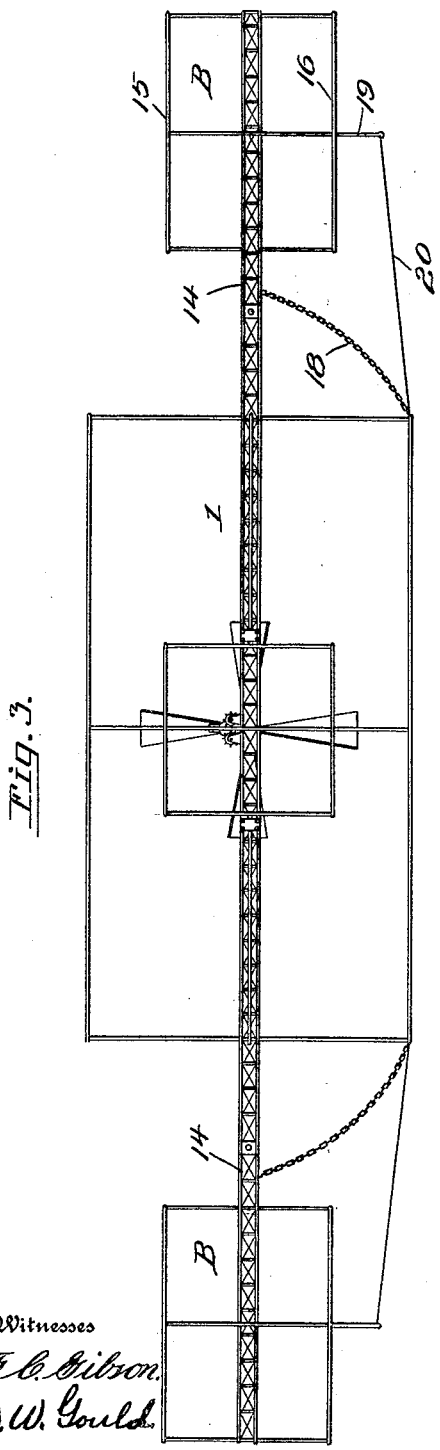
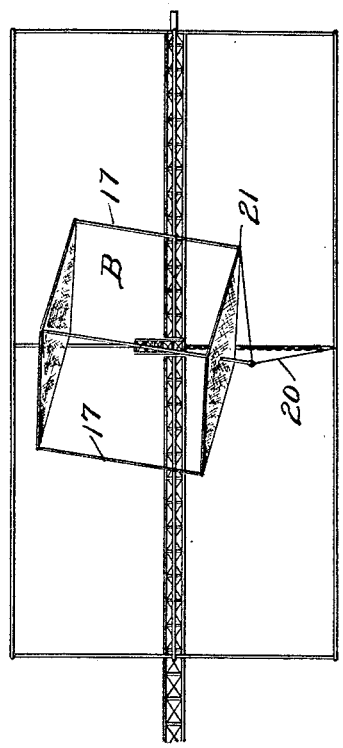

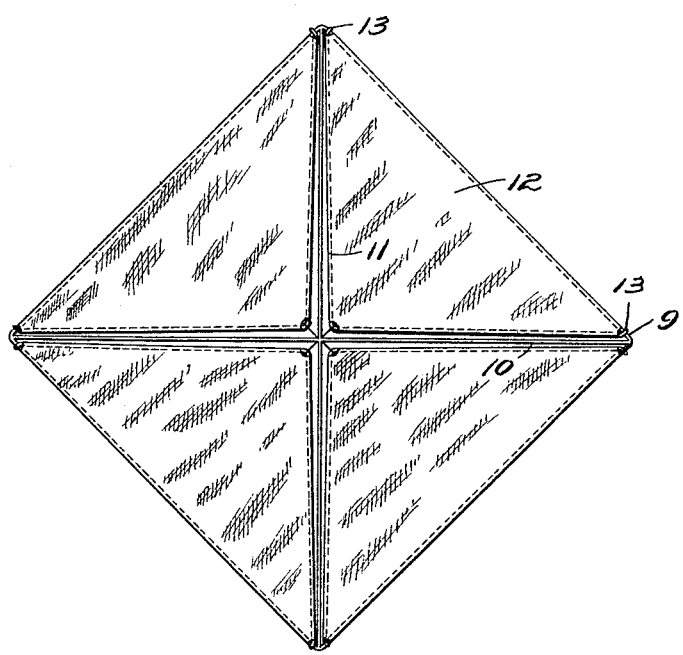
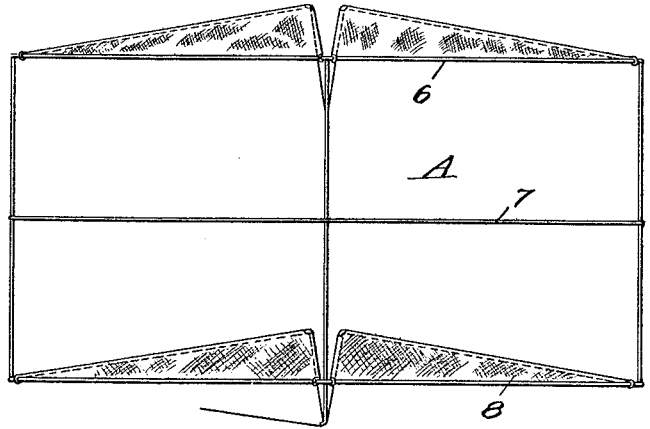

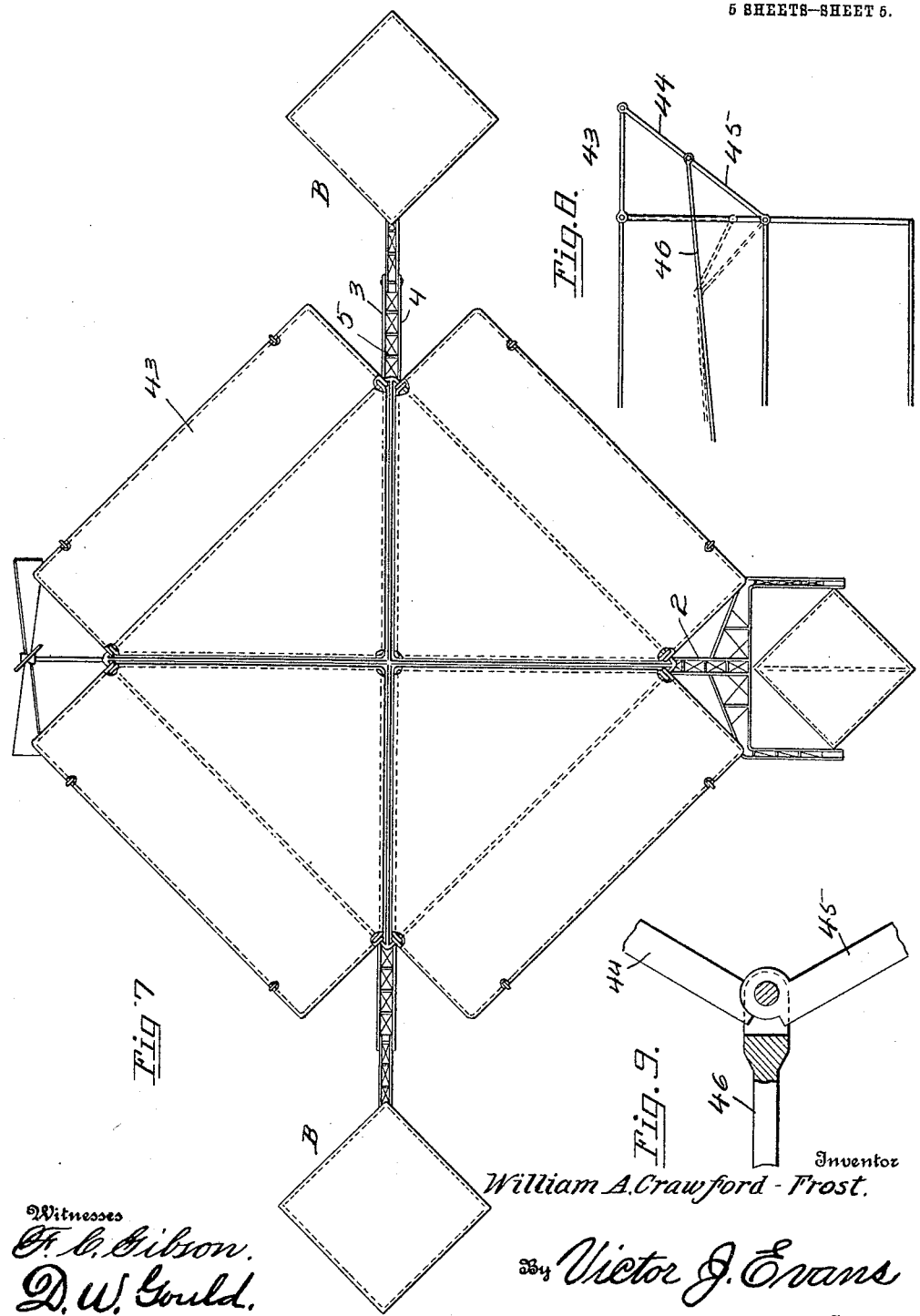

WILLIAM A. CRAWFORD-FROST, OF BALTIMORE, MARYLAND.

AEROPLANE.

1,004,378.          Specification of Letters Patent.     Patented Sept. 26, 1911.

Application filed October 29, 1908. Serial No. 460,046.

*To all whom it may concern:*

Be it known that I, WILLIAM A. CRAWFORD-FROST, a citizen of the United States, residing at Baltimore, in the State of Maryland, have invented new and useful Improvements in Aeroplanes, of which the following is a specification.

The invention relates to an improvement in air ships of the heavier-than-air type, and is particularly directed to means whereby the equilibrium of the main body may be automatically maintained; the height and direction of travel of the main body readily controlled; and the too rapid descent of the body prevented.

The main object of the present invention is the provision of a main body including a series of spaced parallel aeroplanes and a series of auxiliary bodies arranged beyond the main body and connected with the latter for automatic control, the auxiliary bodies being so connected to and operated in the movement of the main body as to automatically correct any dip or variation from the horizontal of the main body.

Another object is the provision of a steering body connected with the main body and including a series of spaced parallel planes and a vertical or rudder plane, the steering body being arranged for tilting movement to vary the angular relation of its horizontal planes to the plane of travel of the main body, whereby to control the angular travel of the main body with relation to the horizontal.

Another object of the invention is the provision of movable sections constituting the horizontal planes of the main body and means for controlling the sections so as to arrange them in plane-forming position or in positions to form parachute-like bodies, whereby in the event of accident or the like the horizontal planes may be in effect converted into parachutes controlling the descent of the body in a well known manner.

The invention will be described in the following specification, reference being had particularly to the accompanying drawings, in which:—

Figure 1 is a view in side elevation of an air ship constructed in accordance with my invention. Fig. 2 is a plan of the same. Fig. 3 is a rear elevation. Fig. 4 is a broken side elevation illustrating the manner of automatically controlling the dip of the main body by means of the auxiliary body. Fig. 5 is a plan of one of the planes of the main body. Fig. 6 is a side elevation of the main body alone, the planes thereof being shown in position to form parachutes. Fig. 7 is a plan view of the improved air ship, showing the same provided with a series of wings. Fig. 8 is a broken elevation, showing the means for controlling the wings. Fig. 9 is a broken elevation, partly in section, showing the arrangement of the wing controlling levers.

Referring particularly to the accompanying drawings, wherein is illustrated the preferred embodiment of details of the present invention, the improved air ship comprises a main body A, auxiliary or side bodies B, and a steering body C. The various parts of the air ship are supported through the medium of a main frame 1, which includes a longitudinal section 2 and a cross section 3. The sections of the main frame are of duplicate construction including longitudinal bars 4 arranged in spaced parallel relation and cross rectangular frame members 5. The frame members 5 are arranged transverse the bars 4, and the skeleton thus provided is braced by diagonally arranged guy wires in appropriate positions to provide a light substantial structure.

The main body is made up of three planes, an upper plane 6, an intermediate or central plane 7, and a lower plane 8. The frame previously described is on a line with the central plane 7, so that the upper and lower planes are above and below the frame respectively. The respective planes are of the same size, and are perfectly square in plan. Each plane comprises a square frame 9 connected by diagonal braces 10, and is arranged so that the respective sections of the main frame lie in parallelism with the diagonal braces 10, or in other words the sections of the main frame project from corner to corner of the square plane.

The central plane 7 has its frame covered by suitable fabric or the like to provide an air resisting medium within the frame, while the plane material of the upper and lower planes is arranged to provide parachute sections. For this purpose I arrange a triangular frame 11 corresponding in dimensions to the space included between one side of the square frame 9 and the diagonal brace strips 10 leading from the ends of that side to the center. The triangular frames thus provided, there being four of course, for each frame, are covered with fabric 12 and are hingedly connected at 13 to the respective sides of the frame 9. By this arrangement the triangular frames and coverings, hereinafter termed the parachute sections, will, when arranged in horizontal alinement, provide a completely closed air resisting element for the particular plane of the main body, while at the same time said parachute sections are adapted to be moved to form an approximately cone-shaped body or parachute, as clearly shown in Figs. 5 and 6.

The cross section 3 of the main frame extends beyond the proximate corners of the main body, and to each terminal of such section there is pivotally connected an additional frame section 14, preferably a duplicate of the frame section 3, but of lighter construction. The outer or free end of each frame section 14 carries one of the auxiliary bodies B, which as shown is made up of a series of normally horizontal parallel planes 15 and 16, also exactly square in plan but of less dimensions than the planes of the main body. The planes of the auxiliary body are also arranged so that the frame sections 14 extend diagonally of the frames. The respective planes of the auxiliary body are arranged above and below the frame section 14 and are connected at their corners by tie bars 17. The diagonally opposite tie bars alined with the frame section 14 are pivotally connected to said section, so that as respects the frame section 14 the planes of the auxiliary body are permitted to dip in the forward or rearward direction. As previously stated the frame section 14 is pivotally connected to the frame section 3, and this connection is so arranged as to permit free upward movement of the outer end of the frame section 14 while preventing a downward movement of said end beyond the horizontal plane of the section 3. A flexible connector, as a chain 18, between the auxiliary frame 14 and the main body, serves to limit the upward movement of the auxiliary body. A rod 19 connects the central points of the upper and lower planes 15 and 16 and extends below the lower plane, being terminally formed with an eye. A cable 20 is connected at one end to the side corner of the frame 9 of the lower plane of the main body, and passed through the eye at the terminal of the rod 19 and connected to the forward point of the lower plane of the auxiliary body, as at 21.

From this construction it will be obvious that by any lateral dip of the planes of the main body, the auxiliary body on that side will at once rise, and, by virtue of the pull upon the cable 20, be tilted in opposition to the dip of the main body. This tends in the forward travel of the air ship to gradually correct the dip of the main body and return the latter to a position of equilibrium. As the main body returns to normal position the auxiliary body also resumes its normal position, as will be clearly apparent from the drawings.

The longitudinal main frame section 2 is extended rearwardly beyond the main body and provided with a rudder frame 22, which includes a cross member and rearwardly extending parallel arms 23. The steering body C is mounted between the arms 23, said body comprising upper and lower planes 24 and 25 corresponding in size and shape to the planes of the auxiliary body B and having their corners connected by brace rods 26, an opposite pair of which is pivotally connected to the free arms 23 so that the steering body is mounted for pivotal movement in a vertical direction to arrange the planes of such body at varying angles to the planes of the main body. Intermediate the planes 24 and 25 I arrange a steering vane 27, comprising a square plane pivotally connected at opposing diagonal edges to the central points of the planes 24 and 25. The steering vane is thus disposed at right angles to the planes of the main body and also at right angles to the planes of the steering body.

On the longitudinal section of the main frame there is supported a suitable engine structure 28, the main shaft 29 of which extends beyond the end of the frame and carries a propeller 30. In this connection it is to be understood that the form of the engine, or of the propeller, is not material to the present invention and any desired form of such structures may be used. Furthermore, the invention contemplates the use of a simple means for controlling the engine and for controlling the speed of the propeller in the usual manner. Secured upon the main frame adjacent the end of the structure is a drum 31 upon which is wound independent cables 32 and 33, the former is connected at the end opposite the connection with the drum to the inner points of the upper parachute sections 12, while the latter extends from the drum about a pulley 34 secured to the frame of the lower plane 8, about a guide 35 arranged centrally of the frame of the lower plane, with its terminal connected to the respective corners of the parachute sections of the lower plane. By suitably operating the drum 31 the respective parachute sections may be drawn down into plane-forming position, or permitted to move upward into parachute-forming position.

Arranged adjacent the drum 31 are independent drums 36 and 37, from the former of which extends cables 38 and 39, which pass over pulleys 40 arranged on the rudder frame and are connected respectively to the forward points of the upper and lower planes of the steering body C. From the drum 37 extend cables 41 and 42, which are connected to the forward edge of the steering vane 27, the cables passing over pulleys so as to lead in different direction from the vane and thereby permit the operator to move the vane in either direction as desired.

Secured on each bar of the frame 9 of the upper plane of the main body is a wing 43 of rectangular shape and hinged or movably connected to the bar. The outer edge of each wing is connected by link bars 44 and 45 to the frame bars of the central plane, each link being pivotally connected at one end to the wing and central plane respectively and at the opposing end to a rod 46, which projects within convenient reach of the operator to permit him to adjust the angular relation of the wing with respect to the upper plane at will.

From the above description taken in connection with the drawings, it will be obvious that the operator may control the elevation of the main body by adjusting the angular relation of the planes of the steering body as desired; and that the sections of the upper and lower planes of the main body may be released to permit their forming into parachute arrangement to insure a slow even descent of the air ship when desired.

The various parts of the structure are to be constructed of such material as will combine lightness, rigidity and strength, and aside from these requirements any material desired may be used.

Having thus described the invention what is claimed as new, is:—

1. An air ship comprising an aeroplane made up of a series of triangular sections with their apices arranged in juxtaposition and their base lines pivotally connected in a fixed plane.

2. An air ship including a body made up of a series of three parallel superimposed planes, the upper and lower of said planes being each composed of pivoted sections to permit conversion of the planes into parachutes.

3. An air ship comprising a main body having three parallel planes, side auxiliary bodies connected to the main body in line with the central plane, and a steering section connected to the main body in line with the central plane thereof.

4. An air ship comprising a main body having three parallel planes, the upper and lower planes being each constructed of a series of movable sections, and means for controlling the movable sections.

5. An air ship comprising a main body made up of a series of three parallel planes, each of said planes being square in plan, and a wing movably connected to each side of the upper of said planes.

6. An air ship comprising a main body made up of a series of three parallel planes, each of said planes being square in plan, a wing movably connected to each side of the upper of said planes, and means for adjusting the angular relation of each wing to said upper plane.

In testimony whereof I affix my signature in presence of two witnesses.

WILLIAM A. CRAWFORD-FROST.

Witnesses:
GEORGE W. MANLEY.
CHAS. M. CARROLL.

Copies of this patent may be obtained for five cents each, by addressing the "Commissioner of Patents, Washington, D. C."